(12) United States Patent
Flynn et al.

(10) Patent No.: US 11,571,979 B2
(45) Date of Patent: Feb. 7, 2023

(54) ELECTRIC VEHICLE CHARGING SYSTEMS AND PLATFORMS

(71) Applicant: EVgo Services, LLC, Los Angeles, CA (US)

(72) Inventors: Cameron Flynn, Los Angeles, CA (US); Catherine Radford Zoi, Los Angeles, CA (US)

(73) Assignee: EVGO SERVICES, LLC

( * ) Notice: Subject to any disclaimer, the term of this patent is extended or adjusted under 35 U.S.C. 154(b) by 22 days.

(21) Appl. No.: 17/156,564

(22) Filed: Jan. 23, 2021

(65) Prior Publication Data

US 2021/0245614 A1 Aug. 12, 2021

Related U.S. Application Data

(60) Provisional application No. 62/965,106, filed on Jan. 23, 2020.

(51) Int. Cl.
*B60L 53/30* (2019.01)
(52) U.S. Cl.
CPC .................................... *B60L 53/30* (2019.02)
(58) Field of Classification Search
CPC ....................................................... B60L 53/30
USPC ......................................................... 320/109
See application file for complete search history.

(56) References Cited

U.S. PATENT DOCUMENTS

| | | | | |
|---|---|---|---|---|
| 6,037,538 A * | 3/2000 | Brooks | ................. | H02G 3/288 |
| | | | | 174/498 |
| 8,558,504 B2 * | 10/2013 | Brown | ................... | B60L 53/18 |
| | | | | 320/109 |
| 10,554,059 B1 * | 2/2020 | Hemingway | ......... | B60L 53/305 |
| 2010/0039067 A1 * | 2/2010 | Hill | ........................ | H02J 7/007 |
| | | | | 320/109 |
| 2010/0277127 A1 * | 11/2010 | Flack | .................... | B60L 53/302 |
| | | | | 254/134.3 R |
| 2011/0169447 A1 * | 7/2011 | Brown | .................... | B60L 53/65 |
| | | | | 320/109 |
| 2012/0013300 A1 * | 1/2012 | Prosser | ..................... | B60L 3/04 |
| | | | | 320/109 |

(Continued)

FOREIGN PATENT DOCUMENTS

| | | | | |
|---|---|---|---|---|
| CN | 106160088 A | * | 11/2016 | |
| CN | 107000595 A | * | 8/2017 | ............. B60L 1/003 |

(Continued)

*Primary Examiner* — Suresh Memula
(74) *Attorney, Agent, or Firm* — Prospera Law, LLP (57) ABSTRACT

A rapidly deployable electric vehicle (EV) charging station and components thereof are disclosed herein. The rapidly deployable electric vehicle charging station is connected to a distribution point on an electrical grid. In one embodiment, the rapidly deployable electric vehicle charging station includes an elevated platform having a top surface and a bottom surface and opposing sides, and at least one beam spanning between the opposing sides and affixed to the bottom surface of the platform. The rapidly deployable electric vehicle charging station includes an electric vehicle charging dispenser coupled to the top surface of the elevated platform. A plurality of cable blocks spanning between the platform and the electrical distribution point, wherein the cable blocks house electrical cabling extending from the electrical distribution point to the electric vehicle charging dispenser.

16 Claims, 8 Drawing Sheets

(56) References Cited

U.S. PATENT DOCUMENTS

| | | | | |
|---|---|---|---|---|
| 2012/0206100 A1* | 8/2012 | Brown | ............... | B60L 53/65 |
| | | | | 320/109 |
| 2013/0320921 A1* | 12/2013 | Muller | ............... | B60L 53/14 |
| | | | | 320/109 |
| 2015/0021085 A1* | 1/2015 | Bethoule | ............... | H02G 1/04 |
| | | | | 174/40 R |
| 2015/0162760 A1* | 6/2015 | Clark | ............... | H02J 7/0042 |
| | | | | 320/103 |
| 2017/0028864 A1* | 2/2017 | Gerhold | ............... | B60L 53/11 |
| 2017/0129356 A1* | 5/2017 | Johnson | ............... | B60L 53/18 |
| 2018/0361863 A1* | 12/2018 | Islinger | ............... | B60L 53/30 |
| 2020/0328604 A1* | 10/2020 | Molle | ............... | B60L 53/30 |
| 2021/0182919 A1* | 6/2021 | Wyckoff | ............... | B60L 53/51 |

FOREIGN PATENT DOCUMENTS

| | | | | | |
|---|---|---|---|---|---|
| DE | 112020000468 | T5 | * | 10/2021 | ............ B60L 3/0007 |
| GB | 2588672 | A | * | 5/2021 | ............. B60L 53/30 |
| GB | 2589326 | A | * | 6/2021 | ............. B60L 53/14 |
| GB | 2591830 | A | * | 8/2021 | ............. B60L 53/12 |
| KR | 2279219 | B1 | * | 7/2021 | |
| KR | 102279220 | B1 | * | 7/2021 | |
| WO | WO-2017222557 | A1 | * | 12/2017 | ............. B60L 11/18 |
| WO | WO-2018119050 | A1 | * | 6/2018 | ......... B60L 11/1816 |
| WO | WO-2020123337 | A1 | * | 6/2020 | ............. B60L 53/16 |
| WO | WO-2020153851 | A1 | * | 7/2020 | ............ B60L 3/0007 |
| WO | WO-2021050186 | A1 | * | 3/2021 | ............ B60L 53/305 |

* cited by examiner

ELECTRIC VEHICLE CHARGING SYSTEMS AND PLATFORMS

CROSS-REFERENCE TO RELATED APPLICATIONS

The present application claims the benefit of U.S. Provisional Patent Application Ser. No. 62/965,106 filed on Jan. 23, 2020, the entire disclosure of which is incorporated herein in its entirety by reference.

FIELD

The subject matter disclosed herein generally relates to electrical vehicle (EV) charging stations. Specifically, this disclosure addresses systems and components for rapidly deployable EV charging stations.

BACKGROUND

EVs are an increasingly popular choice for transportation purposes as it is a more environmentally friendly mode of transportation as compared to fossil-fuel burning vehicles and EVs offer more reliability than internal combustion engine vehicles due to a drastically reduced number of moving parts. The drawback with fully electric vehicles is that the range provided by batteries is limited, and the "fueling" infrastructure available to users of EVs is substantially reduced compared to fossil fuel vehicles. The development of the charging infrastructure for EVs has been a slow, costly process that has not kept up with the increasing popularity of EVs. The scarcity of charging stations, especially in less populated areas, has limited the adoption of EVs.

SUMMARY

A rapidly deployable electric vehicle (EV) charging station and components thereof are disclosed herein. The rapidly deployable electric vehicle charging station is connected to a distribution point on an electrical grid. In one embodiment, the rapidly deployable electric vehicle charging station includes an elevated platform having a top surface and a bottom surface and opposing sides, and at least one beam spanning between the opposing sides and affixed to the bottom surface of the platform. The rapidly deployable electric vehicle charging station includes an electric vehicle charging dispenser coupled to the top surface of the elevated platform. A plurality of cable blocks spanning between the platform and the electrical distribution point, wherein the cable blocks house electrical cabling extending from the electrical distribution point to the electric vehicle charging dispenser.

In another embodiment, a portable platform for a rapidly deployable electric vehicle charging station is disclosed herein. The portable platform includes a top plate having a top surface, bottom surface, and opposing sides, wherein the top plate sized to receive at least one electrical component for charging an electric vehicle. The portable platform includes at first beam affixed to the bottom surface of the top plate, and a second beam affixed to the bottom surface of the top plate, wherein the first and second beam are in spaced relation to one another.

DETAILED DESCRIPTION

Briefly, and in general terms, various rapidly deployable EV charging systems are disclosed herein. In one embodiment, the rapidly deployable EV charging system includes a portable charging platform that may be placed at a particular location and connected to the electric grid to provide a charging station for EVs. The platform is designed to be placed in various locations on a temporary to semi-permanent basis with minimal changes or disruption to the existing location.

In another embodiment, the rapidly deployable EV charging system includes a portable EV charging platform having one or more customer charging dispensers, and other electrical equipment associated with EV charging stations. The other electrical components that may be placed on the platform include, but are not limited to, energy storage systems (e.g., batteries, inverters), electrical distribution equipment (e.g., breakers, switches), and cellular communication components/equipment. The internal components and the number of charging stations may be varied depending on use requirements for this EV charging system. Another aspect of the EV charging system includes a system of electrical conduit/cable blocks that may be assembled together to secure and protect electrical wires running from charging equipment at the mobile charging platform to a distribution panel for the electrical grid.

The various embodiments of the EV charging system may include any number and combination of charging platforms, charging containers, and cable blocks to connect the EV charging equipment contained on the platform or container to a distribution panel or other electrical access point on the public utility grid.

Figure 1:
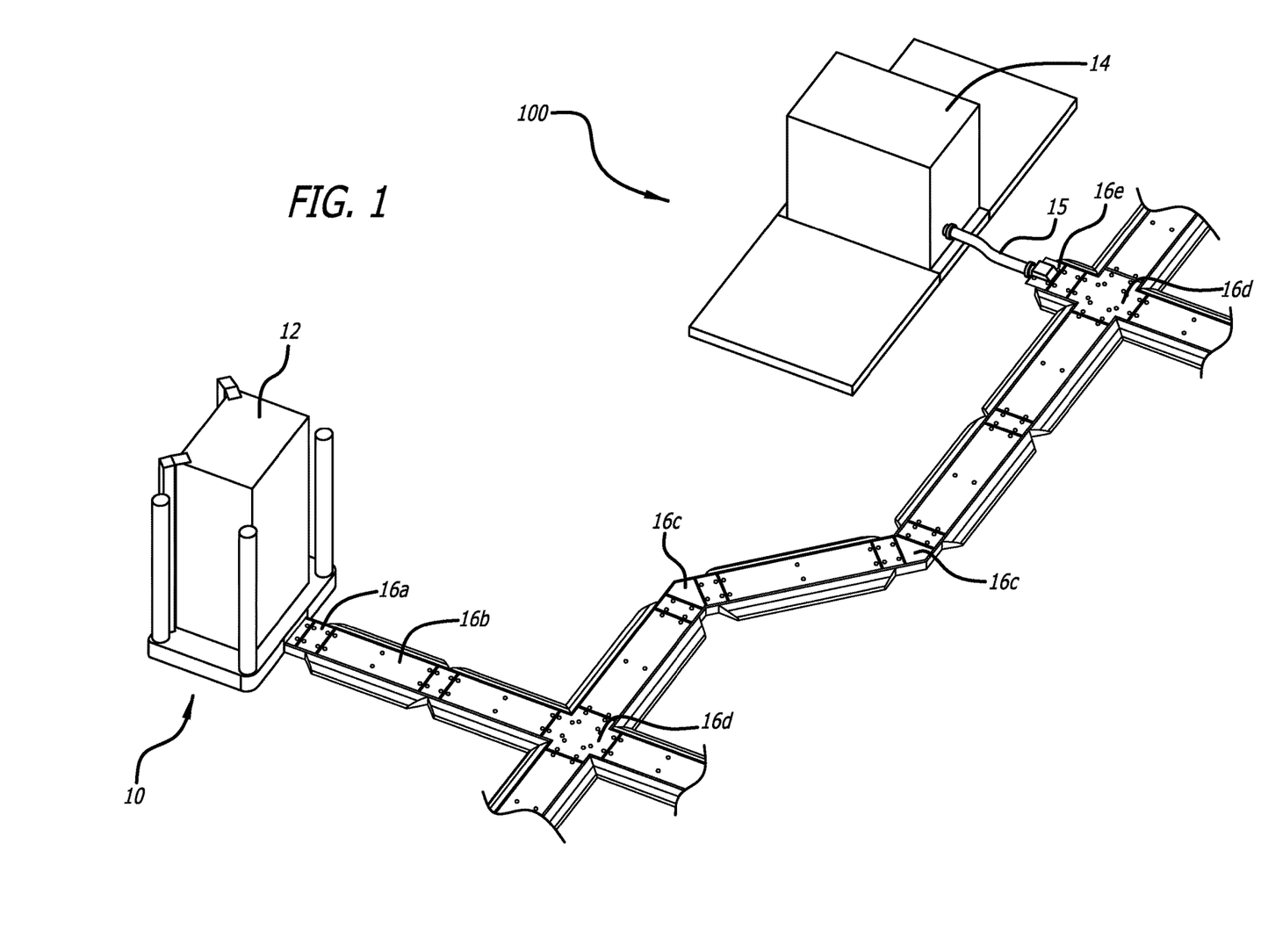
FIG. 1 is a top perspective view of one embodiment of a portable EV charging station.

FIG. 1 illustrates one embodiment of a rapidly deployable EV charging system 100. The system 100 includes one or more EV platforms 10 and one or more EV charging stations 12. The charging stations 12 are connected to an electrical grid component (e.g., distribution panel) 14 via one or more conduit 15. The conduit 15 is protected from damage, tampering, and the elements with one or more cable blocks 16a, 16b, 16c, 16d, 16e. The cable blocks 16a, 16b, 16c, 16d can take many different forms as shown in FIG. 1. For example, a cable block 16a is an interface block that connects the platform 10 to various cable block components. Cable block 16b includes a straight body whereas cable block 16c is a cable block with an angled body. Cable block 16b may have varying lengths. Cable block 16c may be shaped at an angle, such as but not limited to, 10°, 15°, 30°, 45°, 60°, or 90°. In yet another embodiment, the cable block 16d is an intersection block in which multiple conduits may be run in different directions to one or more platforms. In yet another embodiment, the cable block 16e is a universal interface for electrical conduit that runs to the electrical grip component 14.

Figure 2:
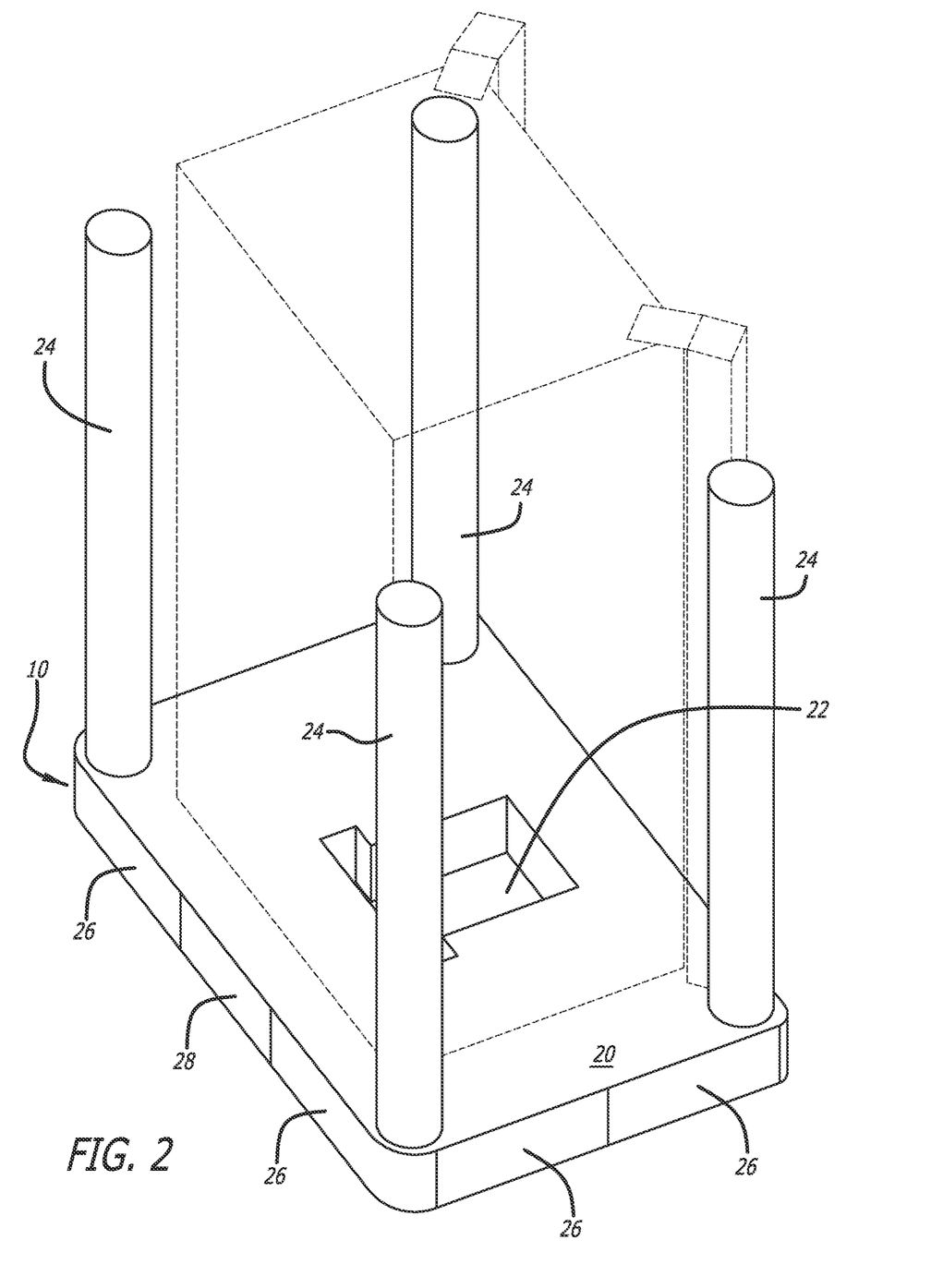
FIG. 2 is a top perspective view of one embodiment of a portable platform.

FIG. 2 illustrates one embodiment of a portable platform 10. The platform 10 includes a top plate 20 with one or more openings. As shown in FIG. 2, the top plate 20 includes an opening 22 approximately centered on the top plate 20. One or more EV components known or developed in the art such as, but not limited to, a 80-kW dispenser and associated wiring may be placed over the opening of the top plate or inserted through the opening 22. The platform 10 includes protective bollards 24 in the corners of the platform. As shown in FIG. 2, the protective bollards 24 are cylindrical, but it is contemplated that other-shaped bollards may be used to protect the EV components.

Figure 3:
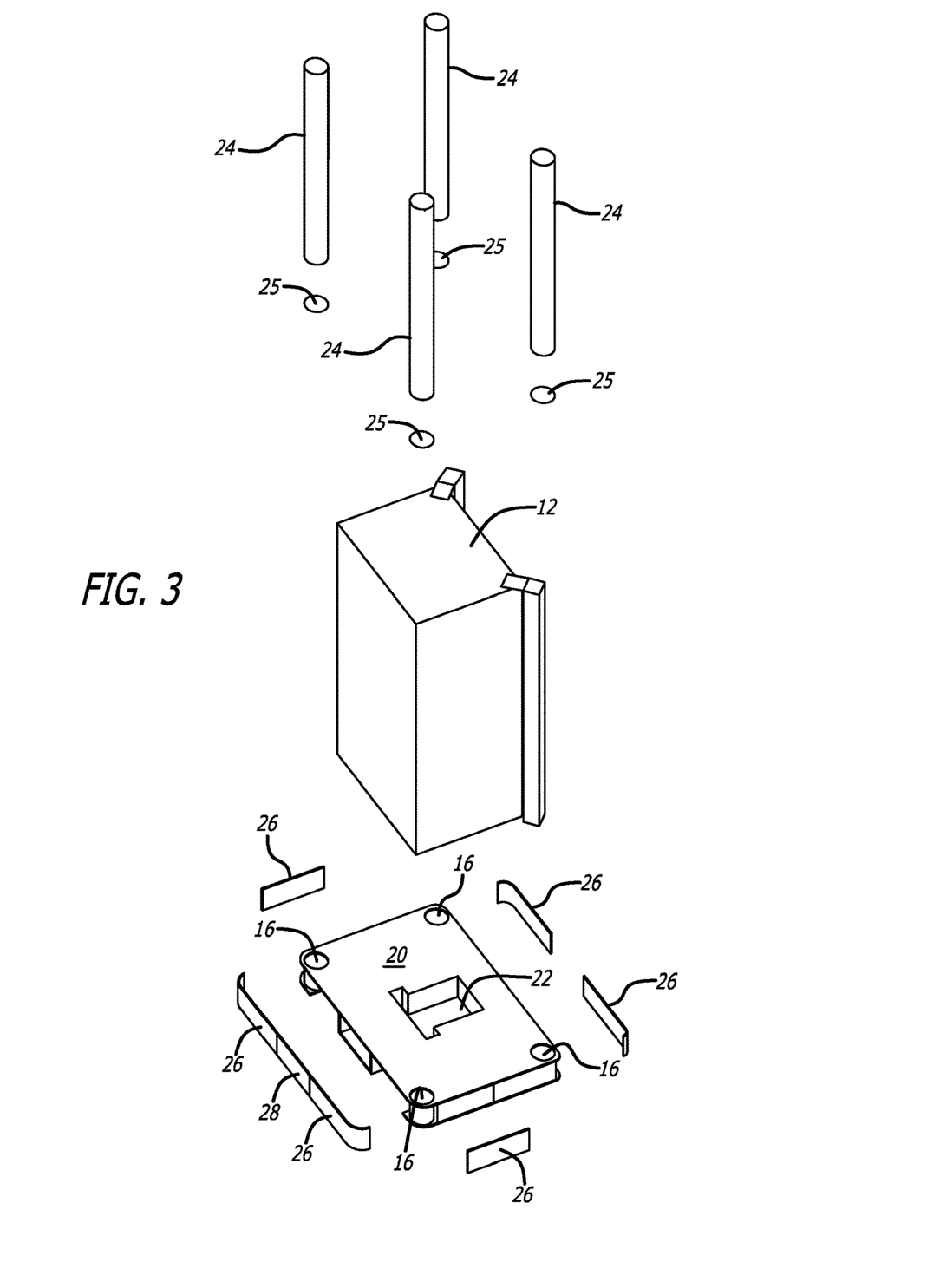
FIG. 3 is an exploded view of the portable platform from FIG. 2.

As shown in FIG. 2, the side panels 26 are positioned around the perimeter of the platform 10. In one embodiment, the side panels 26 may be permanently attached to the platform 10. Alternatively, the side panels 26 are attached to the platform by screws or other means of attachment known and developed in the art. As shown in FIGS. 2-3, a side of the platform 10 may be covered a plurality of panels 26. Alternatively, a side of the platform panel 26 may be a single piece of material. In yet another alternative, a removable panel 28 is attached to the side of the platform 10. This removable panel 28 allows the cable blocks as described below to be attached to the platform 10 as shown in FIG. 1. In another embodiment, the side panel 26 may have circular knock outs (not shown) to receive electrical conduit.

In another embodiment of the platform 10, the top plate 20 is adapted to receive one or more brackets (not shown). The bracket may be welded or otherwise affixed to the top plate with bolts or other fastening means. Alternatively, the top plate 20 may be provided with one or more channels that are sized to receive the brackets (or portions of the brackets).

In another embodiment of the platform 10, the top plate 20 includes "knock outs" (i.e., a partially stamped opening in the top plate that allows quick entry of a wire, cable, pipe, or is otherwise sized for typical EV charging components). Should a particular knock-out no longer be needed, a cover (not shown) is affixed over the knock-out opening by welding, screwing, bolting or otherwise fastening the cover to the top plate to securely cover any unused openings.

As shown in FIG. 3, openings 16 are provided in the corners of the top plate 20. The openings are sized to receive protective bollards 24. The openings 16 may be sized and shaped to accept bollards of varying shapes and sizes. Optionally, covers 25 may be placed over the openings 16 when the protective bollards are not used.

Figure 4:
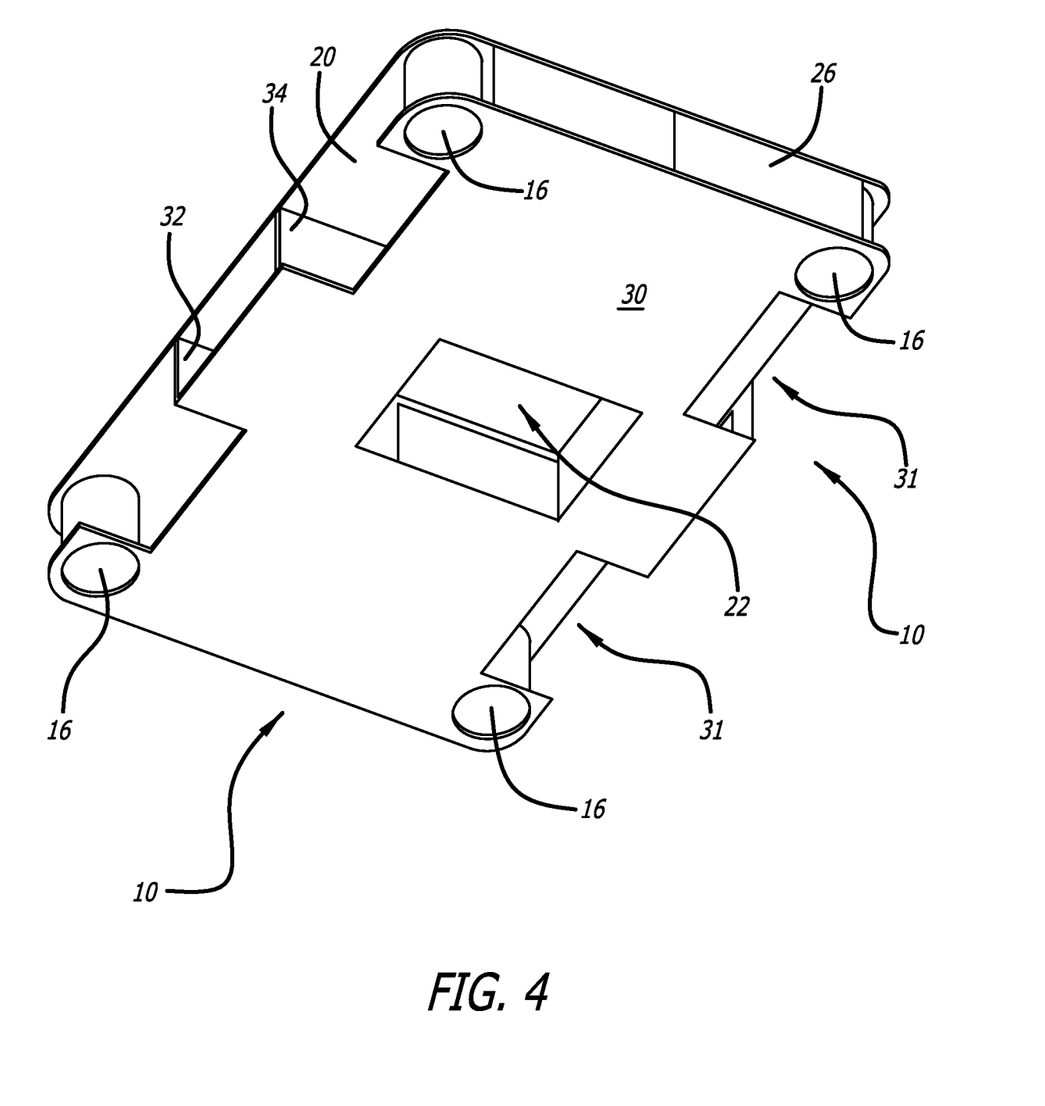
FIG. 4 is a bottom perspective view of the portable platform from FIG. 2.

As shown in FIG. 4, the top plate 20 and the bottom plate 30 are in spaced relationship and connected by two vertical beams 32, 34. In other embodiments, there may be any number (one, three, or more) of vertical beams that interconnect the top and bottom plates. As shown in FIG. 4, each vertical beam may be a single, unitary piece that span between the opposing sides of the plates 20, 30. Alternatively, one or more the vertical beams may be used to span the length of the plates 20, 30. For example, two or more beams (not shown) may be abutted against one another to span from opposing sides of the plates 20,30. In yet another alternative, there may be space between abutting vertical beams to provide space for electrical wiring. In yet another alternative (not shown), the vertical beams may have one or more knock outs spaced along the length of the beam to allow electrical wiring to pass therethrough.

The bottom plate 30 is a generally planar plate. The bottom surface of the bottom plate may be rubberized or a rubber mat may be attached to the bottom surface. The bottom plate may include one or more openings in the corners to allow bollard to be placed through the platform and secured to the ground. Also, the bottom plate 30 may have various support structures (walls, beams) around these openings to prevent the bollards from moving or being displaced. As shown in FIG. 4, cut-outs 31 may be provided on the bottom plate 30. The cut-outs 31 accommodate the forks of a forklift to allow for the platform to be easily moved.

The top plate 20, bottom plate 30, and vertical beams 32, 34 may be made of metal, stainless steel, carbon fiber, fiberglass, wood, plastics synthetics, concrete, high strength, low alloy steel, and/or any other materials. In one configuration, the top and bottom plates 20, 30 are made of ½" steel. In one embodiment (not shown), the bottom surface of the bottom plate is rubberized (i.e., a rubber coating is applied to the surface). Alternately, a rubber mat (not shown) may be placed between the bottom plate 30 of the platform 10 and the ground. In other embodiments, the surfaces of the top plate and side panels may be painted, coated, treated or finished in order to protect the surfaces of the platform 10.

As shown in FIGS. 1-4, the platform 10 has a polygonal shape such as, but not limited to, a generally rectangular shape. It is also contemplated that the platform 10 may be in the shape of a square, parallelogram, triangle, circle, and/or any other desired shape. While FIGS. 3-4 shown the top and bottom plates having the generally the same overall shape, it is also contemplated that the top and bottom plates may have different shapes.

In another embodiment, the platform (not shown) includes a top plate, at least two vertical beams attached to the bottom surface of the top plate, and one or more side panels attached along the perimeter of the top plate. In other words, this embodiment is similar to the platform described and shown in FIGS. 1-4 with the exception of the omission of the bottom plate. In this embodiment, the vertical beams keep the top plate elevated off the ground so that cabling for the EV components can be run to an electrical distribution panel on the electrical grid.

In yet another embodiment, the platform (not shown) includes a top plate, a vertical beam positioned below the top plate at one edge of the top plate and a second vertical beam positioned blow the top plate at an opposite edge. A third vertical beam is placed approximately in the middle of the top plate. One or more side panels 26 may be placed around the perimeter of the platform. The side panels may include one or more knock outs (not shown) to engage the cable blocks or other electrical conduits.

As those skilled in the art will appreciate, the platform may include any number top plates, vertical beams, side panels, and bottom plates to form a portable, platform to which one or more EV charging components may be attached thereto.

In another aspect, cable blocks 16a, 16b, 16c, 16d, 16e may be utilized with the portable platform 10 as shown in FIG. 1. The cable blocks 16a, 16b, 16c, 16d, 16e provide an above-ground conduit for the electrical wiring connecting the electrical grid components 14 to the EV components affixed to the portable platform. The cable blocks provide a secure, reusable electrical cabling protection system. The cable blocks are easy to deploy, assemble, and remove as compared to the traditional methods of trenching and conduit systems used to bury electrical cables.

Figure 5:
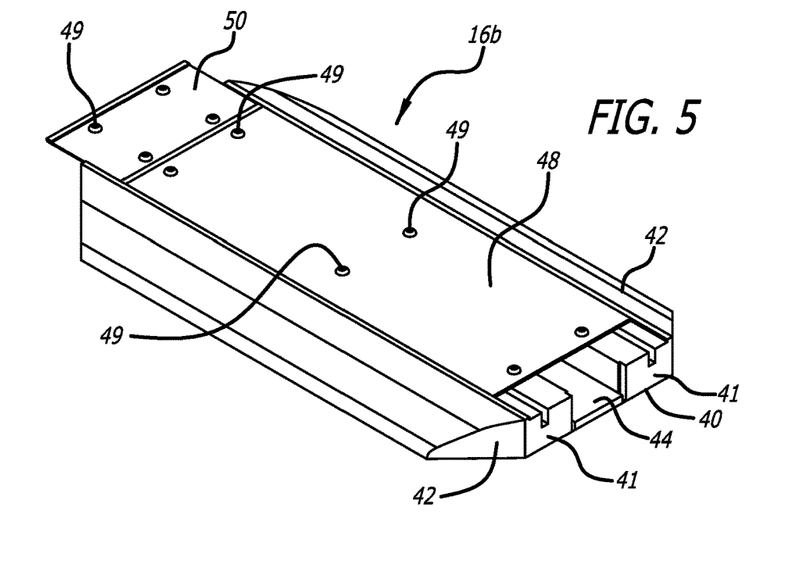
FIG. 5 is a perspective view of one embodiment of a cable block used in a portable EV charging station.
Figure 6:
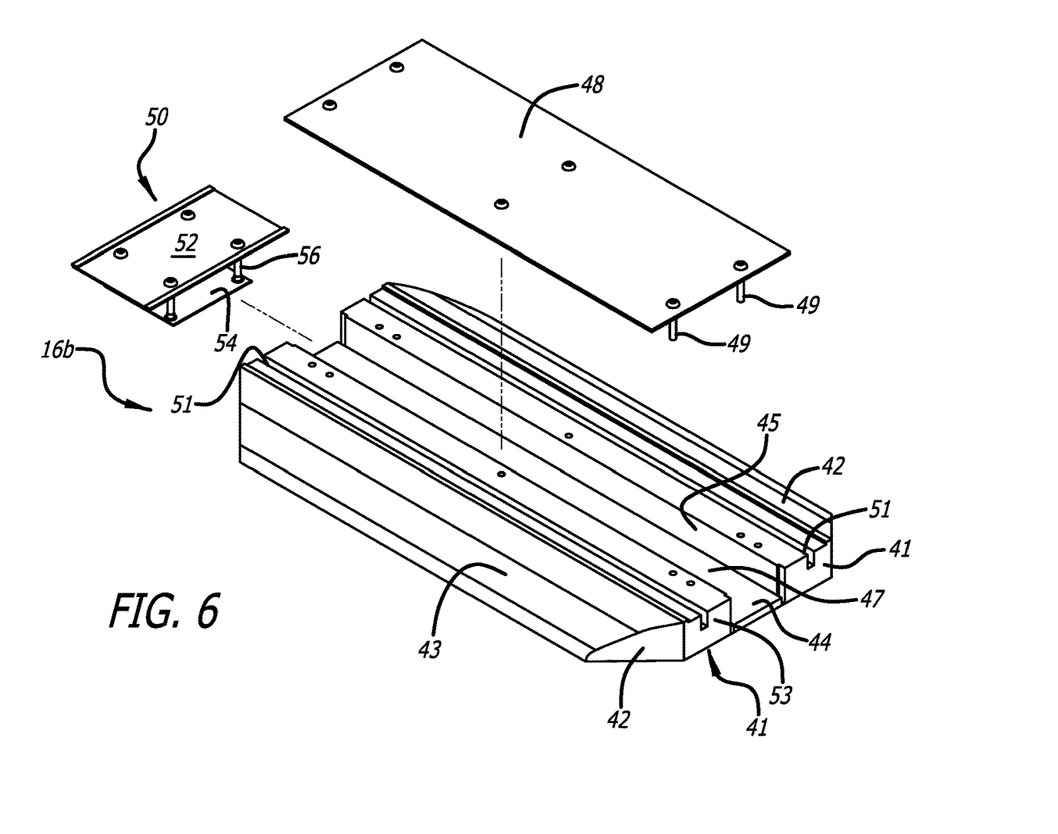
FIG. 6 is an exploded view of the cable block taken from FIG. 5.

Generally, as shown in FIG. 1, the cable blocks 16a, 16b, 16c, 16d, 16e are above-ground, modular components. As shown in FIG. 5, the cable block 16b having a main body 41 having a flat base 40, sloping side walls 42 on the exterior of the main body of the cable block, and a main channel 44 running through the middle of the main body. As shown in FIGS. 5-6, adjacent channels 46 run aside the main channel 44, and a plate 48 that may be affixed to the main body so as to cover the main channel and the adjacent channels of the main body 41. As shown in the FIGS. 5-8, the plate 48 is a flat top and bottom surfaces. The plate 48 also includes one or more openings to allow fasteners 49 to affix the plate to the cable block. In another embodiment, the plate (not shown) may be permanently affixed to the block via one or more hinges. In another aspect, the top surface of the plate 48 is rounded (i.e., flat bottom surface and rounded top surface) or sloped. Alternatively, separate rounded or sloped surface may be attached to the top of the plate 48.

Additionally, flanges 50 are attachable to the ends of the cable block as shown in FIGS. 5-6. The flanges 50 include a top plate 52 and a bottom plate 54 and affixed together with a plurality of fastening members 56. The flanges are used to connect adjacent cable blocks, prevent the intrusion of contaminants, and secure the content of the channel as prevents potential thieves from visually inspecting the contents of the channel. In another embodiment, the flange (not shown) is a single piece of material with an upper surface that covers the main channel and an opening in the flange to permit conduit and cabling to pass therethrough.

As shown in FIG. 5, the main channel 44 is sized to receive cabling that will be placed from the EV charging equipment mounted to the portable platform 10 to the distribution box 14 or another component of the electrical grid. As shown in FIG. 5, the main channel 44 has side walls 45 that are generally perpendicular to the base 47 of the channel. In alternate embodiments (not shown), the channel may be generally U-shaped (with a rounded base) or a V-shaped channel. As shown in FIGS. 5-6, there are auxiliary channels 51 that span the length of the cable block 16b.

In one embodiment, the end surfaces 53 of the cable blocks 16a, 16b, 16c, 16d are chamfered or otherwise angled to provide some play (few degrees) so that adjacent blocks may be secured together to account for uneven surfaces or slight elevation changes. In other words, the end surface of the cable block is slightly rounded when viewing the block from a top plan view. Alternatively, the ends of the cable blocks are generally flat so that ends of adjacent blocks abut one another with minimal movement between the blocks when secured. This prevents intrusion of moisture, dirt, or other contaminants.

The cable block shown in FIG. 5 is generally rectangular in shape when viewed from a top plan view. As shown in FIGS. 5-6, the side walls 42 are tapered. In other words, the side wall 42 is composed of a sloping surface 43 and generally flat side wall and bottom wall. The sloping surface allows for objects or wheels to roll over the outer surface of the cable blocks. As shown in FIG. 5, the side wall 42 is a right triangle when viewed from the end of the cable block as the side wall and the bottom wall are generally perpendicular and the hypotenuse is the sloped surface 43. As shown in FIG. 5, there are sloping side walls 42 on opposite sides of the cable block 16b. In another embodiment, the cable block (not shown) may be provided with one sloping side wall. In this embodiment, the cable block may be abutted against a curb with the sloped surface 42 facing outwards and the generally perpendicular wall abutting the curb. In other embodiments, the side walls 42 may be permanently affixed to the body of the cable block. Alternatively, the side walls 42 are reversibly attached to the body of the cable block with fasteners or by other means developed in the art.

Figure 7:
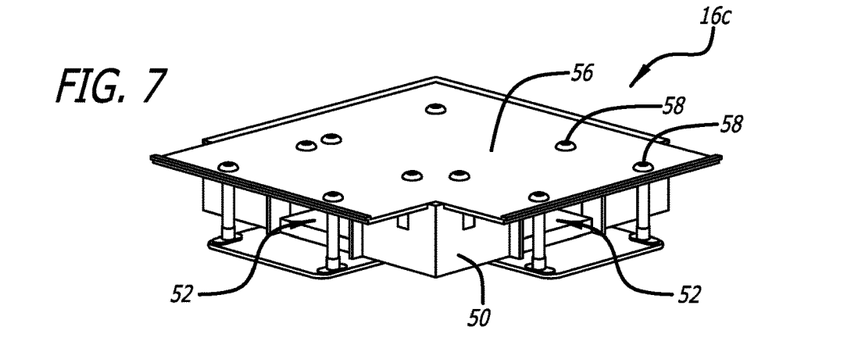
FIG. 7 is a perspective view of another embodiment of a cable block used in a portable EV charging station.
Figure 8:
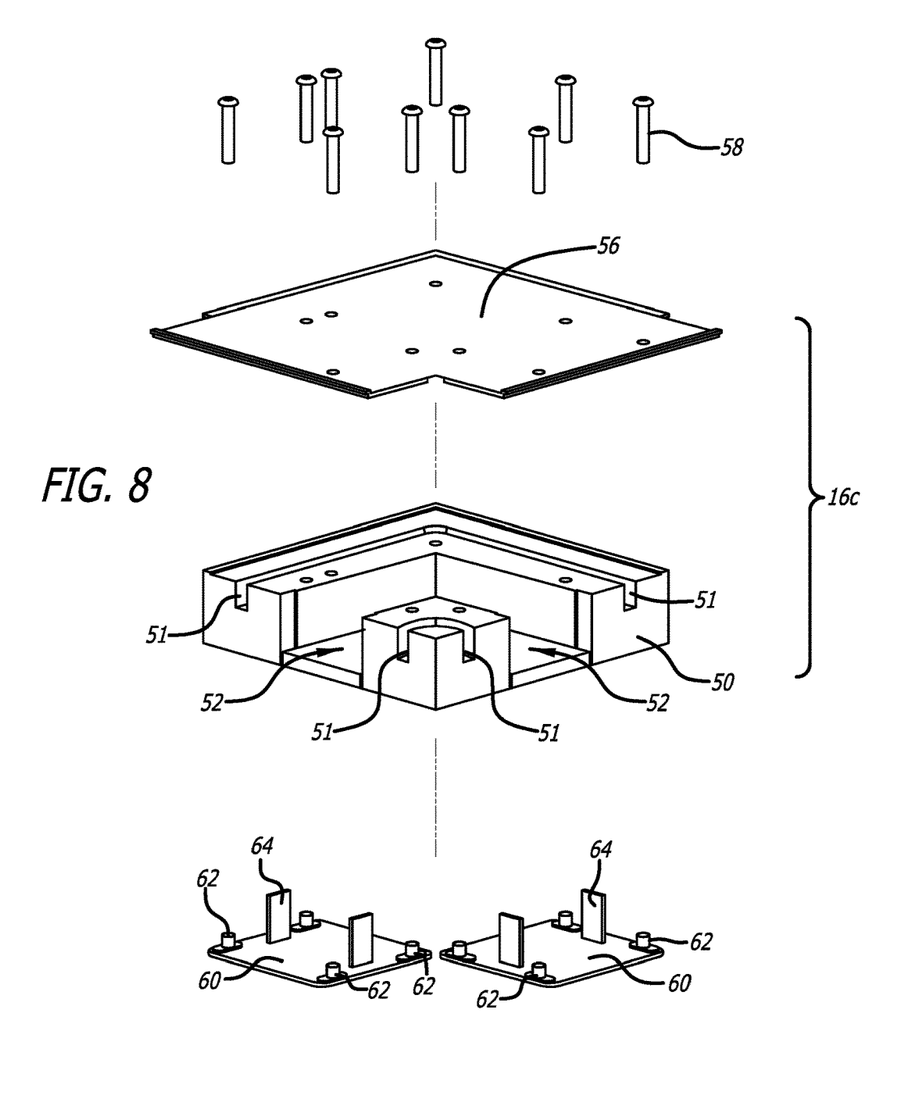
FIG. 8 is an exploded view of the cable block taken from FIG. 7.

As shown in FIGS. 5-6, the cable block 16b is a straight block having varying lengths ranging between approximately 6" to approximately 48" in length. As shown in FIG. 1, the cable block 16c may be configured to bend at any angle between 5° to 90°. Turning now to to FIGS. 7-8 illustrates a cable block 16e having a main body 50 having a main channel 52. The main channel 52 is a channel with a 90° angle. The cable block 16e also includes adjacent channels 52 for various auxiliary cabling and wiring. The adjacent channels also have a 90° angle. The cable block 16e includes a cover 54 that is fastened to the body 50 of the cable block 16e.

As shown in FIGS. 7-8, a cover 56 is affixed to the main body 50 of the cable block 16e by a plurality of fastening members 58. As shown in FIG. 6, the cover 56 extends over the ends of the main body 50. A corresponding base 60 is attached to the main body 50. The cover 56 and the base 60 may be coupled together by fasteners 58. As shown in FIG. 7, the base 60 includes protuberances 62 that allow the base 60 to the main body 50 of the cable block 16e. The base 60 also includes walls 64 that abut the main body 50 of the cable block 16e. The walls 62 act as an extension of the main channel 52. The combination of the cover 54 and the base 60 allows adjacent cable blocks to be coupled together and securely seal the main channel of the cable blocks.

Figure 9:
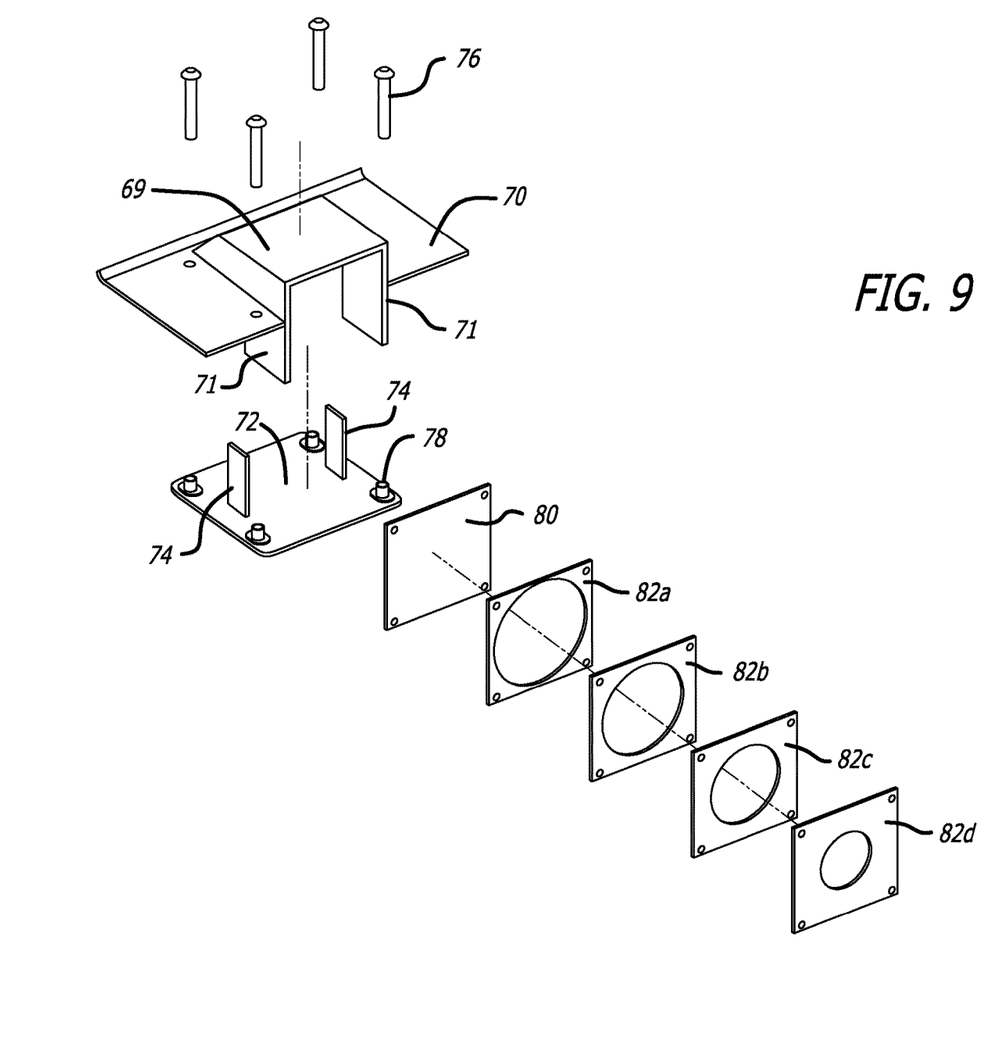
FIG. 9 is an exploded view of another embodiment of a cable block used in a portable EV charging station.
Figure 10:
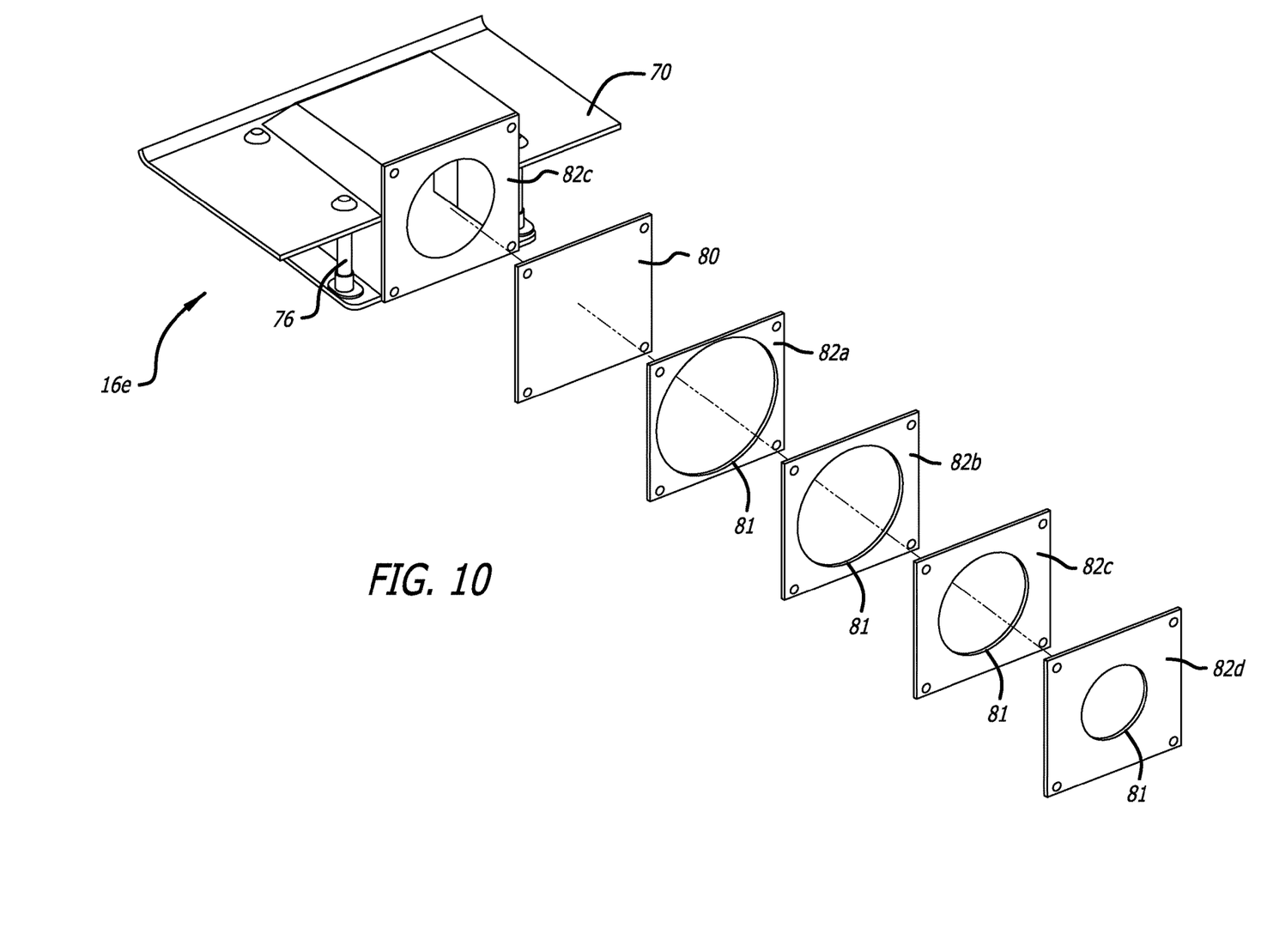
FIG. 10 is a perspective view of the cable block of FIG. 9.

FIG. 9-10 illustrates a cable block 16e that is a universal interface for electrical conduit that runs from an electrical grip component 14 to an EV charging station 12. The cable block 16e includes a body 69 integral with a flange 70. The cable block 16e includes walls 71 coupled to the body 69. The cable block 16e includes a base 72 that is coupled to the body 69 via fastening members 76,78. The base 72 also includes walls 74 coupled to the base. The cable block 16e includes one more plates 80, 82a, 82b, 82c, 82d that may be substituted for one another based on the size of the conduit. As shown in FIGS. 9-10, the plate 82a-d include an opening with differing diameters. Alternatively, there is a plate 80 that does not include any opening which can seal the cable block 16e. A plate 80, 82a-d may be selected and attached to the opening defined by the body 69, walls 71,74, and the base 72. FIG. 10 illustrates one plate 82c to the coupled to the cable block 16e.

In another embodiment, the cable block 16d is shaped to form a x-shaped channel as shown in FIG. 1. In another embodiment, the cable block (not shown) is shaped to form a T-shaped channel. In yet another embodiment, an end cap (not shown) that includes a removable wall. The end cap (not shown) includes a lock and hook protruding therefrom so to securely engage an end of a cable block. This end cap secures the channel and prevents animals, insects, or persons from gaining access to the channel that will contain the electrical wiring.

Although an embodiment has been described with reference to specific example embodiments, it will be evident that various modifications and changes may be made to these embodiments without departing from the scope of the present disclosure. Accordingly, the specification and drawings are to be regarded in an illustrative rather than a restrictive sense. The accompanying drawings that form a part hereof show by way of illustration, and not of limitation, specific embodiments in which the subject matter may be practiced.

The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

It is submitted with the understanding that it will not be used to interpret or limit the scope or meaning of the claims. In addition, in the foregoing Detailed Description, it can be seen that various features are grouped together in a single embodiment for the purpose of streamlining the disclosure.

The invention claimed is:

1. A deployable electric vehicle charging station coupled to an electrical distribution point on an electrical grid, comprising:
   an elevated platform having a top surface and a bottom surface and opposing sides; and at least one beam spanning between the opposing sides and affixed to the bottom surface of the platform;
   an electric vehicle charging dispenser coupled to the top surface of the elevated platform; and
   a plurality of cable blocks spanning between the platform and the electrical distribution point, wherein the cable blocks house electrical cabling extending from the electrical distribution point to the electric vehicle charging dispenser.

2. The charging station of claim 1, wherein the elevated platform further comprises an opening on the top surface.

3. The charging station of claim 1, wherein the elevated platform further comprises at least one side panel attached to a perimeter of the platform.

4. The charging station of claim 3, wherein the side panels are detachable from the platform.

5. The charging station of claim 1, wherein the elevated platform further includes a bottom plate having a top surface and a bottom surface, wherein the top surface of the bottom plate is affixed to the at least one beam.

6. The charging station of claim 1, wherein the elevated platform further comprises one or more protective bollards in spaced relation about the top surface.

7. The charging station of claim 1, wherein the cable box comprises:
   an elongated main body having a top, bottom, and opposing sides;
   a main channel running lengthwise along the elongated main body; and
   a cover attachable to the top of the main body.

8. A portable platform for a deployable electric vehicle charging station, comprising:
   a top plate having a top surface, bottom surface, and opposing sides, wherein the top plate sized to receive at least one electrical component for charging an electric vehicle;
   at first beam affixed to the bottom surface of the top plate;
   a second beam affixed to the bottom surface of the top plate, wherein the first and second beam are in spaced relation to one another; and
   at least one side panel attached to the perimeter of the platform, wherein the at least one side panel is detachable from the platform.

9. The portable platform of claim 8, further comprising an opening on the top surface.

10. The portable platform of claim 8, further comprising a bottom plate having a top surface and a bottom surface, wherein the top surface of the bottom plate is affixed to the first and second beams.

11. The portable platform of claim 8, further comprises one or more protective bollards in spaced relation about the top surface of the top plate.

12. A portable platform for a deployable electric vehicle charging station, comprising:
   a top plate having a top surface, bottom surface, and opposing sides, wherein the top plate sized to receive at least one electrical component for charging an electric vehicle;
   at first beam affixed to the bottom surface of the top plate;
   a second beam affixed to the bottom surface of the top plate, wherein the first and second beam are in spaced relation to one another; and
   an opening on the top surface.

13. The portable platform of claim 12, further comprising at least one side panel attached to the perimeter of the platform.

14. The portable platform of claim 13, wherein the at least one side panel is detachable from the platform.

15. The portable platform of claim 12, further comprising a bottom plate having a top surface and a bottom surface, wherein the top surface of the bottom plate is affixed to the first and second beams.

16. The portable platform of claim 12, further comprising one or more protective bollards in spaced relation about the top surface of the top plate.

* * * * *